UNITED STATES PATENT OFFICE.

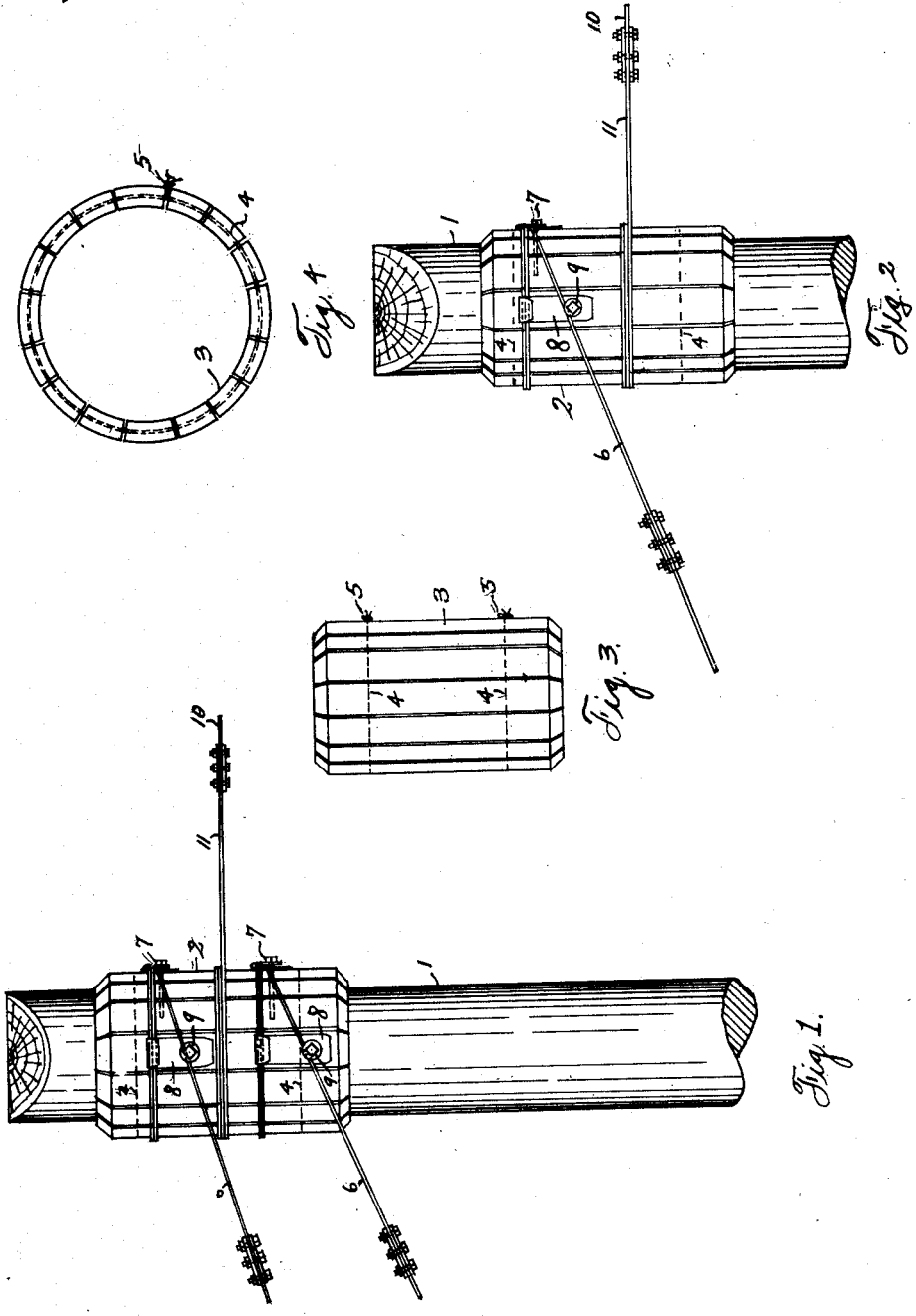

WILLIAM M. McKNIGHT, OF HOUSTON, TEXAS.

STRAIN-JACKET FOR TELEPHONE-POLES.

1,369,119. Specification of Letters Patent. Patented Feb. 22, 1921.

Application filed January 22, 1918. Serial No. 213,231.

*To all whom it may concern:*

Be it known that I, WILLIAM M. McKNIGHT, a citizen of the United States, residing at Houston, in the county of Harris and State of Texas, have invented certain new and useful Improvements in Strain-Jackets for Telephone-Poles, of which the following is a specification.

This invention relates to new and useful improvements in a strain jacket for telephone poles.

The object of the invention is to provide a device of the character described designed to protect and strengthen telephone and telegraph poles, as well as other poles which sustain overhead wires.

As is well known, telephone, telegraph and other overhead wires are usually sustained by wooden poles and the poles at the end of the line and at angles where the wires exert a lateral pull are subjected to great strain due to the weight of the cables and wires, and therefore must be braced and held in position by means of guy wires which are wrapped therearound at one end, and attached to a stationary object at the other end. As now applied, these guy wires gradually cut into the pole and weaken the same and cause the top end thereof to break off, thus causing interruption of service over the wires in addition to considerable expense and labor in replacing them. It is the object of this invention to reinforce and strengthen said poles, to prevent them from breaking.

With the above and other objects in view, the invention has particular relation to said novel features of construction, arrangement of parts and use, an example of which is given in this specification and illustrated in the accompanying drawings wherein:—

Figure 1 shows a side view of a pole reinforced and held in position by means of two guy wires.

Fig. 2 shows a side elevation thereof as reinforced and held in position by one guy wire, and Figs. 3 and 4, show side and end views respectively of my improved device.

Referring now particularly to the drawings wherein like numerals of reference designate similar parts in each of the figures, the numeral 1, refers to a wire-sustaining pole having the sheath 2, around it. This sheath is formed of a plurality of oblong blocks 3, preferably of wood, placed side by side around the pole. These blocks are first secured together by means of wires as 4, 4, which pass therethrough and when placed around the pole, the free ends of these wires are tied together at 5.

As shown in Fig. 1, guy wires 6, 6 are wrapped around the sheath near their upper and lower ends, respectively, and then attached to a stationary object (not shown). Bolts 7, 7 are driven through the sheath and into the pole underneath the turns of the wires 6, and opposite their points of attachment. Metallic side plates 8, 8 are provided through the lower ends of which the bolts 9, 9, pass to secure the said plates in position, said bolts 7 and 9, also securing said sheath to the pole. The upper ends of the plates 8, pass under the coils of the wires 6, and are bent over said coils to secure them in place as well as to protect the sheath. In Fig. 2, a single guy wire 6 is shown which is secured in position in the same manner as shown in Fig. 1.

The poles shown in the drawings are dead end poles to which the cable 10 is attached. This cable is secured to the pole by means of the wire 11, which is wrapped around the center of the sheath and attached to the end of said cable, as shown. This cable is of great weight and exerts a great pull against said pole and were it not for the said sheath, the guy wires would soon cut into said pole and weaken the same, causing it to break.

What I claim is:—

A sheath for protecting and reinforcing a wire sustaining pole, said sheath being formed of a plurality of oblong blocks, placed side by side around the pole, tie wires passing through the blocks and whose free ends are secured together, metallic side plates secured to the sheath, and whose upper ends are overturned, said sheath being provided as an anchorage for guy wires, which are wrapped therearound, the overturned portions of said side plates forming bearings for and supporting the turns of said wire.

In testimony whereof I have signed my name to this specification in the presence of two subscribing witnesses.

WILLIAM M. McKNIGHT.

Witnesses:
E. V. HARDWAY,
J. W. WOODS.